US010530967B1

(12) United States Patent
Frank et al.

(10) Patent No.: US 10,530,967 B1
(45) Date of Patent: Jan. 7, 2020

(54) ASSIGNING HALFTONE SCREENS TO CLUSTERED IMAGE PORTIONS BASED ON COLOR AND CONTENT

(71) Applicants: Hewlett-Packard Development Company, L.P., Spring, TX (US); Purdue Research Foundation, West Lafayette, IN (US)

(72) Inventors: Tal Frank, Ness Ziona (IL); Altyngul Jumabayeva, West Lafayette, IN (US); Robert Ulichney, Stow, MA (US); Jan Allebach, West Lafayette, IN (US); Yotam Ben-Shoshan, Ness Ziona (IL)

(73) Assignees: Purdue Research Foundation, West Lafayette, IN (US); Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/375,692

(22) Filed: Apr. 4, 2019

(51) Int. Cl.
| | |
|---|---|
| *H04N 1/52* | (2006.01) |
| *H04N 1/58* | (2006.01) |
| *G06K 9/62* | (2006.01) |
| *H04N 1/60* | (2006.01) |
| *H04N 1/40* | (2006.01) |
| *G06K 15/02* | (2006.01) |

(52) U.S. Cl.
CPC .............. *H04N 1/52* (2013.01); *G06K 9/6223* (2013.01); *G06K 15/1878* (2013.01); *G06K 15/1881* (2013.01); *H04N 1/40062* (2013.01); *H04N 1/58* (2013.01); *H04N 1/6005* (2013.01); *H04N 1/6008* (2013.01); *H04N 1/6016* (2013.01)

(58) Field of Classification Search
CPC .. H04N 1/405–4058; H04N 1/52; H04N 1/54; H04N 1/56; H04N 1/60–6097; G06K 9/6217; G06K 9/6218; G06K 9/622; G06K 9/6221; G06K 9/6222; G06K 9/6223; G06K 15/1878; G06K 15/1881
See application file for complete search history.

(56) References Cited

U.S. PATENT DOCUMENTS

| | | | |
|---|---|---|---|
| 6,250,733 B1 | 6/2001 | Yao et al. | |
| 6,285,800 B1* | 9/2001 | Yamazaki | H04N 1/4058 |
| | | | 382/199 |
| 6,400,467 B1 | 6/2002 | Harrington | |
| 7,528,971 B2 | 5/2009 | Harrington | |
| 7,660,017 B2* | 2/2010 | Karito | H04N 1/4055 |
| | | | 358/3.06 |
| 8,363,273 B2 | 1/2013 | Morovic et al. | |
| 8,363,280 B2 | 1/2013 | Dalal et al. | |
| 9,025,208 B2 | 5/2015 | Kisilev et al. | |
| 9,602,693 B1* | 3/2017 | Tanaka | G06K 9/6223 |
| 2006/0197989 A1* | 9/2006 | Herron | H04N 1/405 |
| | | | 358/3.06 |

(Continued)

*Primary Examiner* — Scott A Rogers

(74) *Attorney, Agent, or Firm* — HP Inc. Patent Department

(57) ABSTRACT

Certain examples described herein relate to the halftoning of a color image. In one example, a set of clusters are determined based on the color image. A set of edges are also detected in the color images. Clusters within these edges are then merged. A set of screens for halftoning are assigned to the set of clusters. This assignment is based on color property metrics for the set of clusters. The color image is halftoned using the set of screens assigned to the merged clusters.

15 Claims, 7 Drawing Sheets

(56) References Cited

U.S. PATENT DOCUMENTS

| | | |
|---|---|---|
| 2010/0091333 A1 | 4/2010 | Bailey |
| 2015/0103094 A1 | 4/2015 | Xue et al. |
| 2018/0239998 A1* | 8/2018 | Igawa .................. H04N 1/4055 |

* cited by examiner ated on image content and color. Clustering and edge detection may be performed to segment the color image into different image portions. Halftone screen assignment may then be varied across these different image portions. This allows for improved local assignments of halftone screens to output color channels while allowing for smoothness correction. This in turn reduces a likelihood of image artifacts forming. The described examples may be particularly useful in digital printing presses, such as large-scale liquid electrophotographic (LEP) print systems.

ASSIGNING HALFTONE SCREENS TO CLUSTERED IMAGE PORTIONS BASED ON COLOR AND CONTENT

BACKGROUND

In image reproduction systems there is a challenge of outputting color representations using a limited number of addressable color outputs. For example, in printing systems, a digital color image is often defined within a Red-Green-Blue (RGB) color space where pixels have a range of values for each color channel, e.g. in an 8-bit representation, each color channel may have one of 256 values or in a 24-bit representation, each color channel may have one of over 16 million values. However, a color printer may be equipped with three or four available colorants, such as Cyan-Magenta-Yellow-Key (e.g. Black) inks (CMYK). Each colorant may be deposited in a discrete manner at a print resolution pixel on a substrate, e.g. in a binary case, a colorant may or may not be deposited.

Halftoning is one technique to simulate a representation of a continuous tone image using a constrained rendering device. Halftoning involves the configuration of sets of small image elements, such as dots, so that from a distance a rendered color output resembles the original continuous tone image. Halftoning may be applied using a set of halftone screens. These screens may be defined by specifying a desired screen frequency and angle. In the past, halftone screens were physically constructed for use with offset printing presses. In modern digital printing presses, halftone screens may be generated electronically based on data defining the screen frequency and angle.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

As color halftoning generates a discrete approximation of a continuous tone image with multiple overlaid screens, its application may result in image artifacts. For example, overlaid screens may lead to interference effects such as moiré patterns. Additionally, color representations may experience what is referred to as "graininess", a perceived unevenness of tone in areas where a continuous tone is expected. In complex printing systems with many degrees of freedom, small variations may introduce image artifacts that are difficult to predict and/or prevent. It is thus desired to provide halftoning approaches for use with digital images that improve output quality and reduce artifacts.

Certain examples described herein are directed towards the halftoning of a color image. The examples may be used to improve image quality when performing halftoning. In certain examples, a halftoning operation is adapted based on image content and color. Clustering and edge detection may be performed to segment the color image into different image portions. Halftone screen assignment may then be varied across these different image portions. This allows for improved local assignments of halftone screens to output color channels while allowing for smoothness correction. This in turn reduces a likelihood of image artifacts forming. The described examples may be particularly useful in digital printing presses, such as large-scale liquid electrophotographic (LEP) print systems.

Figure 1:
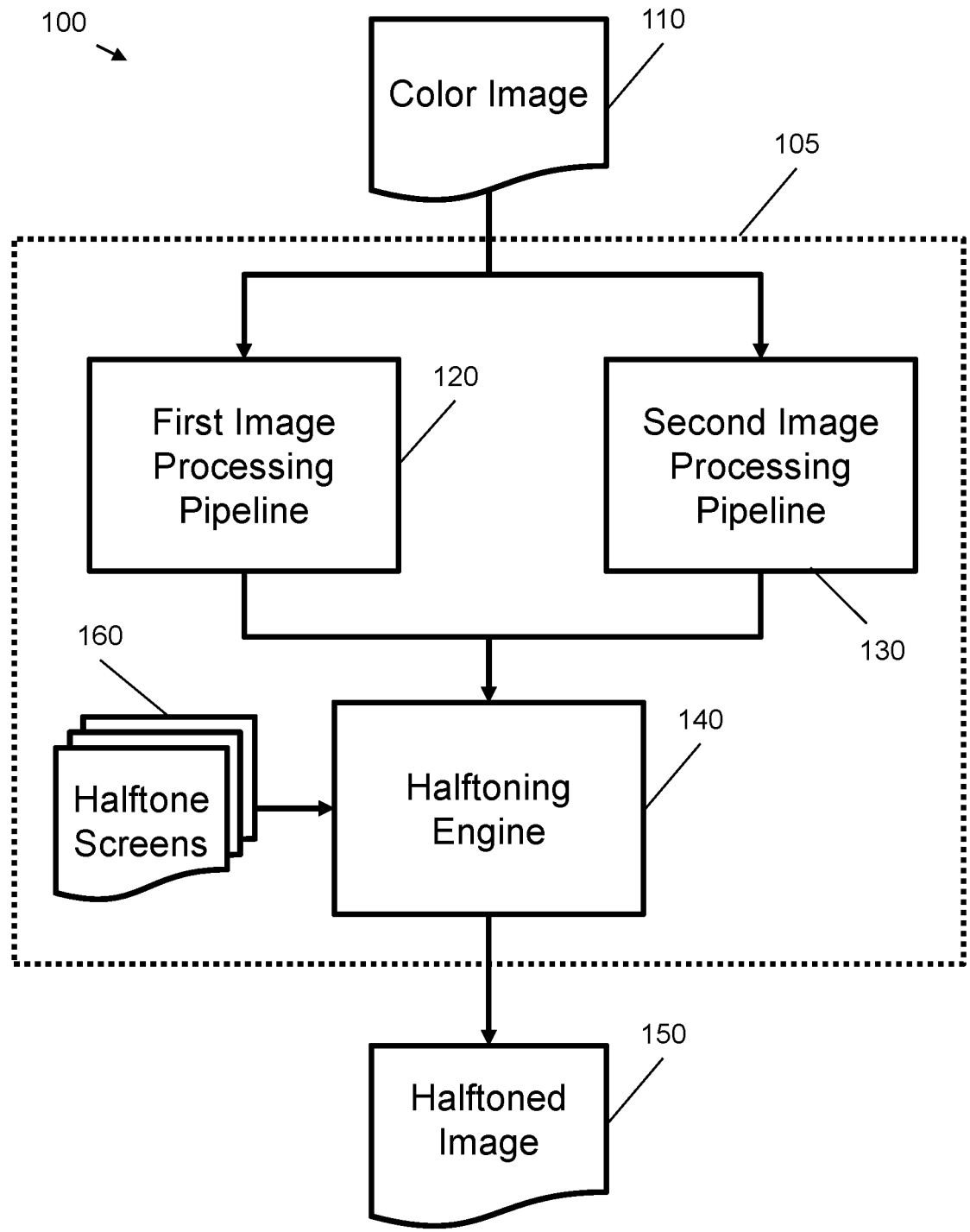
FIG. 1 is a schematic illustration of a color processing system according to an example.

FIG. 1 shows an example 100 of a color processing system 105. The color processing system 105 may be implemented in the form of a computing device running a digital frontend application and/or electronic circuitry forming part of a digital printing press, such as an LEP printing device.

The color processing system 105 is configured to receive a color image 110. The color image 110 may comprise color values for a plurality of pixels. The color image 110 may be defined based on a predefined color space. The color image 110 may be defined in one of a variety of device dependent or device independent color spaces. For example, the color image 110 may comprise a Red-Green-Blue (RGB) color image. The color image 110 may be mapped to a particular predefined color space as part of a preprocessing operation.

The color processing system 105 of FIG. 1 comprises a first image processing pipeline 120, a second image processing pipeline 130 and a halftoning engine 140. In the present example, the first image processing pipeline 120 and the second image processing pipeline 130 receive the color image 110. The first and second image processing pipelines 120, 130 perform a number of image processing operations and provide output data for the halftoning engine 140. The halftoning engine 140 is configured to apply a halftoning operation to generate a halftoned image 150. The halftoned image 150 comprises data that indicates an assignment of output color channels to addressable output areas. For example, if the halftoned image 150 is to be printed on a digital printing press, the halftoned image 150 may comprise data to instruct deposit or placement of a set of available colorants at a set of areas representing addressable portions of a print substrate (e.g. as defined by a particular number of dots per inch—DPI).

In the present example, the color processing system 105 of FIG. 1 is configured with a set of halftone screens 160 for use in halftoning the color image 110. The set of halftone screens 160 are accessed by the halftoning engine 140. Although the set of halftone screens 160 are shown as forming part of the color processing system 105 in FIG. 1, in other examples they may be retrieved from an external device. In one case, the set of halftone screens may comprise a set of halftone screens that are optimized for a given digital printing press, e.g. that have been designed to reduce image artifacts when printing on the digital printing press. In certain examples, there may be one screen per available colorant; e.g. in a Cyan-Magenta-Yellow-Key (e.g. Black) (CMYK) printing press there may be four screens in the set, in a CMY printing press there may be three screens. In one case, the halftone screens in the set of halftone screens may comprise data defining one or more of: a screen frequency (e.g. a spatial frequency indicating a particular spacing of dots in a halftone pattern) and a screen angle (e.g. an angle to a reference axis such as the vertical). The screen angle may indicate a rotation for a regular grid of halftone dots and the screen frequency may indicate a distance between successive dots in the grid. The halftone screens in the set may be regular or irregular. In certain cases, the halftone screens may be periodic clustered-dot halftone screens that are suitable for electrophotographic printing systems.

In the example 100 of FIG. 1, the first image processing pipeline 120 is configured to perform a first segmentation of the color image. The first segmentation is based on color data from the color image 110. The first segmentation is performed in order to determine an assignment of the halftone screens 160 to different portions of the color image. The first segmentation may be performed by determining a set of clusters based on the color image 110. The set of clusters may represent a first set of segments. The set of clusters may be determined based on pixel color data for the color image 110. In one case, a number of clusters may be set as a configurable parameter. The first image processing pipeline 120 is configured to assign the set of halftone screens 160 based on color property metrics for the set of clusters. For example, the first image processing pipeline 120 may compute one or more color property metrics for each cluster, and then use these color property metrics to evaluate a set of possible screen assignments for the cluster. In one case, the screen assignment for a cluster may comprise an assignment of each screen in the set of halftone screens to a particular output channel for the rendering of the color image 110, e.g. an assignment of each screen to a particular colorant available in a digital printing press.

The second image processing pipeline 130 is configured to perform a second segmentation of the color image. The second segmentation is based on the content of the color image 110. In certain examples, the second image processing pipeline 130 is configured to detect a set of edges in the color image 110. The set of edges may then be used to determine a second set of segments. The second image processing pipeline 130 is configured to process the color image 110 to determine continuous areas of the color image 110, e.g. areas within the detected edges.

In the example 100 of FIG. 1, the halftoning engine 140 is configured to receive data from the first image processing pipeline 120 representing a result of the clustering and screen assignment, and to receive data from the second image processing pipeline 130 representing the detected set of edges. The halftoning engine 140 then uses the received data to merge clusters assigned to image portions within the detected set of edges and to generate the halftoned image 150 using the set of screens assigned to the merged clusters. For example, the halftoning engine 140 may be configured to receive a set of clusters, and screen assignments for those clusters, from the first image processing pipeline 120. A plurality of clusters from the set of clusters that are within a particular set of edges, e.g. that are within a particular second segment defined by the output of the second image processing pipeline 130, may be merged by selecting one cluster to replace the plurality of clusters. The screen assignment for the selected cluster may then be used, e.g. may be applied to image portions within the second segment. In this manner, the halftoning engine 140 integrates outputs of both the first and second image processing pipelines 120, 130 and merges the first and second segments to generate a final segmentation of the color image 110. This final segmentation and the screen assignments from the first image processing pipeline 120 are then used to halftone the color image 110, e.g. be applying the screens as defined in the screen assignments to each segment in the final segmentation. In this manner, the functionality of the halftoning engine 140 is extended relative to comparative halftoning engines that apply a fixed assignment of the halftone screens 160 to different output color channels, e.g. where the halftone screens are paired in a one-one manner with each of a set of full colorant images before halftoning.

The color processing system 105 of FIG. 1 thus synergistically combines color-based processing within the first image processing pipeline and content-based processing within the second image processing pipeline to perform color and content dependent halftoning in a manner that considers local variations within the color image 110. The color processing system 105 may help reduce an appearance of image artifacts, such as graininess, in smooth areas of the input color image 110. As such, the color processing system 105 may improve the image quality of rendered images. For example, the color processing system 105 may process color images 110 with large areas of continuous tone, such as portraits with large areas of skin tone, and output a halftoned image 150 that instructs a high-quality printed image on a digital printing press.

In certain cases, functions of the first image processing pipeline that assign the halftone screens 160 to the clusters may be applied following merging by the halftoning engine 140. For example, an initial set of assignments may be checked and/or updated based on the modified clusters and/or screen assignment may be delayed until merging of clusters is complete. In this manner, the halftoning engine 140 is still configured to halftone the color image using the set of screens assigned to the merged clusters, but the assignment performed by the first image processing pipeline 120 is performed after the halftoning engine 140 has merged the clusters.

The first image processing pipeline 120, the second image processing pipeline 130, and the halftoning engine 140 may be implemented by any combination of hardware and programming. For example, these components may comprise different modules or libraries of a digital frontend or operating system, and/or may be implemented as part of embedded circuitry for a digital printing press. In certain implementations, the programming for these components may be in the form of processor executable instructions stored on at least one non-transitory machine-readable storage medium and the hardware for these components may include at least one processing resource to execute those instructions. The processing resource may form part of a printing device within a printing system, or a computing device that is communicatively coupled to the printing device. In some implementations, the hardware may include electronic circuitry such as an application-specific integrated circuit. In certain cases, the components may form part of a distributed computing system and may be implemented by separate computing devices that are communicatively coupled.

Figure 2:
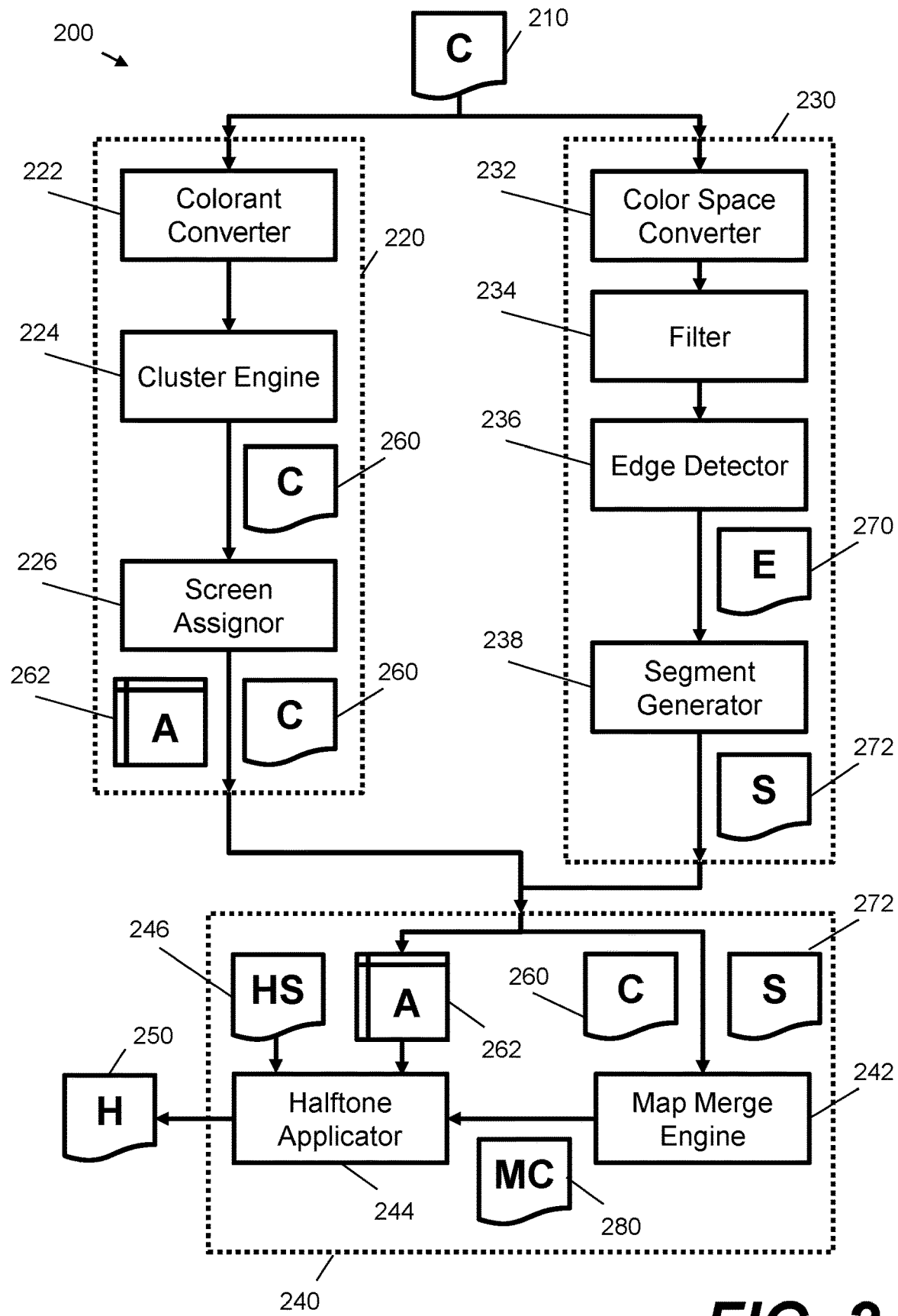
FIG. 2 is a schematic illustration showing various subcomponents of a color processing system according to an example.

FIG. 2 shows an example 200 of a set of components that may be used to implement the first image processing pipelines 120, the second image processing pipeline 130, and the halftoning engine 140 of FIG. 1. These components are shown as one example; other components may also be used to implement the first image processing pipelines 120, the second image processing pipeline 130, and the halftoning engine 140 of FIG. 1 in other examples. The example of FIG. 2 is described with reference to printing a color image on a digital printing press, however, in other examples, similar components may be used to render a color image on a different output device, e.g. any device with a set of discrete output color states that can be set for a given addressable output area.

The example of FIG. 2 shows an image processing system 200 that is configured to receive a color image 210. This may be a color image as described with reference to the color image 110 of FIG. 1. In the example 200 of FIG. 2, the color image 210 is an RGB image. In the present example, the color image 210 comprises a digital image file for printing on a digital printing press. The color image 210 may be defined as a plurality of pixels, where each pixel has a corresponding RGB value. In FIG. 2, the color image 210 is communicated to a first set of image processing components 220 and a second set of image processing components 230. The first set of image processing components 220 may be used to implement the first image processing pipeline 120 of FIG. 1. The second set of image processing components 220 may be used to implement the second image processing pipeline 130 of FIG. 1. It should be noted that each set of components is provided as an example and that actual implementations may comprise additional components or differing configurations depending on the properties of the color rendering device, the color image 210 and/or the desired halftone output format.

The first set of components 220 comprise a colorant converter 222, a cluster engine 224, and a screen assignor 226. The colorant converter 222 receives the color image 210 and maps it to a colorant color space. The colorant color space corresponds to the set of colorants available to the digital printing press. In one example, the set of colorants may be CMYK; in other examples, the digital printing press may have a different set of colorants (e.g. CMY or CcM-mYK where 'c' and cm' represent light cyan and light magenta). The colorant converter 222 may map from RGB to colorant space using a predefined color mapping, e.g. in the form of a look-up table that maps between nodes in RGB space and nodes in colorant space, where values between these nodes are determined using interpolation. In the present example, the output of the colorant converter 222 is a color image in the colorant color space. This is sometimes referred to as a set of color separations, e.g. as it may be viewed as a set of monotone color images for the corresponding set of colorants. In one example, each pixel of the color image output by the color converter 222 has an associated CMYK vector value. In other examples, the conversion performed by the colorant converter 222 may be performed upstream in an image processing pipeline; as such, the first set of components may receive a pre-prepared color image in the colorant color space instead of the color image 210.

Remaining within the first set of components 220, the cluster engine 224 receives the color image defined in the colorant color space and applies a clustering operation to generate a set of clusters. Clustering may be performed by an unsupervised machine learning function, such as K-means clustering, where 'K' equals a desired number of clusters. In this case, the value of K may be supplied with the color image 210 and/or retrieved from a parameter store or memory. The cluster engine 224 may cluster data from the color image defined in the colorant color space based on a similarity measure. In one case, the similarity measure may be based on absorptance values associated with each of the colorants, e.g. as defined in an absorptance vector. The cluster engine 224 may begin by randomly selecting K centroids, where each centroid is associated with a different cluster. Pixels of the color image received from the colorant converter 222 may then be assigned to a cluster with a nearest centroid, e.g. as based on the similarity measure, which may be a distance function in Euclidean space (such as an $L_2$ measure), where the space is defined by elements of an absorptance vector. Once the pixels have been assigned, new centroids may be determined based on the pixels assigned to each cluster. A new centroid for a cluster may be determined based on an average of absorptance vectors for the set of pixels assigned to the cluster. This process may be repeated for a predefined number of iterations and/or until convergence is reached. In one case, a maximum of ten iterations may be performed.

The cluster engine 224 outputs cluster data 260, which indicates the determined set of clusters. The cluster data 260 may comprise values of the final centroids of the K clusters and a cluster map. The values of the final centroids may be defined in terms of absorptance vectors, each final centroid having an associated absorptance vector with elements for each of the set of available colorants. In one case, each final centroid value also indicates an average set of absorptance values for each cluster across the set of available colorants. The cluster map may comprise a version of the color image 210 where each pixel of that image is assigned an integer value or string label indicating an assigned cluster. In this case, each pixel may have one of K values.

In FIG. 2, the cluster data 260 is received by the screen assignor 226. The screen assignor 226 is configured to determine a colorant-screen mapping for the clusters defined in the cluster data 260. The colorant-screen mapping for a cluster indicates one of a set of halftone screens 246 to use for each of the set of colorants. For example, if the set of colorants comprise CMYK and there are four halftone screens, then there may be 24 possible combinations of screens and colorants. In this case, each cluster is provided with an assignment of the four halftone screens to the four colorants, where each cluster may have a different assignment. This approach thus differs from a comparative case where there is a fixed colorant-screen mapping for all pixels, e.g. where before printing each of the four screens is assigned to a predefined colorant and this screen is used to halftone all pixels in a color separation for the predefined colorant. In FIG. 2, the screen assignor 226 outputs screen assignment data 262 indicating a set of colorant-screen mappings for the set of clusters. The screen assignment data 262 may indicate how the available halftone screens 246 are assigned to a set of available colorants for each cluster, e.g. in the form of a look-up table or the like. The screen assignment data 262 and the cluster data 260 thus form the output of the first set of components 220. This output is then communicated to a third set of components 240. The third set of components 240 may be used to implement the halftoning engine 140 of FIG. 1.

In the example of FIG. 2, the second set of components 230 are also applied to the color image 210. The second set of components 230 may be applied in parallel with the processing performed by the first set of components 230 as described above. The second set of components 230 comprise a color space converter 232, an image filter 234, an edge detector 236 and a segment generator 238. The color space convertor 232 receives the color image 210 and converts it into a colorimetric color space. For example, in one case, the color image 210 may be defined in a device-dependent color space and the color space convertor 232 converts the color image 210 to a device-independent color space. In one case, the colorimetric color space comprises one of the CIEXYZ color space and the CIELAB color space (where CIE refers to the Commission Internationale de l'Eclairage). In the case where the color space converter 232 converts the pixel color values to the device-independent CIELAB color space, an output may be provided in the form of a L*a*b* vector with values representing lightness (L*), green-red (a*) and blue-yellow (b*).

In the example of FIG. 2, the output of the color space converter 232 is communicated to the image filter 234. The image filter 234 in this example filters the color image to smooth the image while preserving large-scale edges without blurring. In certain cases, the image filter 234 may comprise a bilateral filter that is applied to L*a*b* vector values output by the color space converter 232. The filtered color image is then communicated to the edge detector 236. The edge detector 236 is configured to detect a set of edges in the color image as output by the image filter 234. The edge detector 236 may apply a Sobel edge detector. In certain cases, edge detection may be performed by applying hysteresis thresholding to a gradient map for each of the color channels output by the color space converter 232.

In FIG. 2, the edge detector 236 outputs an edge map 270. The edge map 270 may comprise a set of labelled pixels, where the labels indicate whether the pixel is deemed to relate to an edge in the image or not. In certain cases, the edge map 270 may comprise a binary image. The edge map 270 is received by the segment generator 238. Post processing of the edge map 270, such as thinning or connected component analysis may be applied by one or more of the edge detector 236 and the segment generator 238. Post processing may be performed to improve edge definitions within the edge map 270. The segment generator 238 is configured to use the edge map 270 to generate a segment map 272. The segment map 272 indicates a set of segments based on the edges indicated in the edge map 270. In one case, the segment generator 238 may determine a predefined number of segments S. The segments may be taken as image areas enclosed by the detected edges and may be selected in order of decreasing size. The segment map 272 may be of a similar form to the cluster map 260, where each pixel in the segment map 272 has a label indicating one of S segments. The segment map 272 may also have a pixel value indicating that the pixel does not belong to one of the S segments. In one case, after S−1 segments have been labelled, the remaining pixels may be assigned to the $S^{th}$ segment. The segment map 272 forms the output of the second set of components 230. This output is then communicated to the third set of components 240 along with the cluster data 260 and the screen assignment data 262 from the first set of components 220.

The third set of components 240 in FIG. 2 may be used to implement the halftoning engine 140 of FIG. 1. The third set of components 240 comprise a map merge engine 242 and a halftone applicator 244. The map merge engine 242 receives the cluster data 260 from the first set of components 220 and the segment map 272 from the second set of components 230. The map merge engine 242 is configured to merge the cluster map from the cluster data 260 with the segment map 272 to generate a merged cluster map 280. The merged cluster map 280 may be viewed as a further segmentation of the color image, where one or more of the clusters in the original cluster map are merged in particular image areas as defined in the segment map 272. The halftone applicator 244 is configured to receive the merged cluster map 280 from the map merge engine 242 and the screen assignment data 262 from the first set of components 220. The halftone applicator 244 then applies the set of halftone screens 246 to the merged cluster map 280 according to the screen assignment data 262 to generate a halftoned image 250, which may be similar to the halftoned image 150 of FIG. 1.

In one case, the map merge engine 242 map iterate through each of the segments in the segment map 272 (e.g. each of S segments) and for each given segment determine a number of pixels within the segment that are assigned to each cluster. The cluster having the greatest number of pixels may then be selected as a replacement cluster. Pixels within the cluster map that correspond to pixels within the given segment, and that are not assigned to the replacement cluster, may then be modified to be assigned to the replacement cluster. In this manner, pixels within the cluster map that correspond to the given segment in the segment map 272 are merged into a single cluster. After iterating through each segment, the result is the merged cluster map 280, where each pixel is assigned to one of the K clusters. The halftone applicator 244 then applies halftoning on a per-cluster basis, with each cluster having a particular colorant-screen mapping as defined within the screen assignment data 262. The use of a cluster map and a segment map provides improved image quality for images with large areas of continuous tone, such as portraits of faces. Although, the screen assignment data 262 is generated before the merged cluster map 280 in FIG. 2, in other examples it may be generated or modified following the operation of the map merge engine 242, e.g. based on the clusters as merged.

Figure 3A:
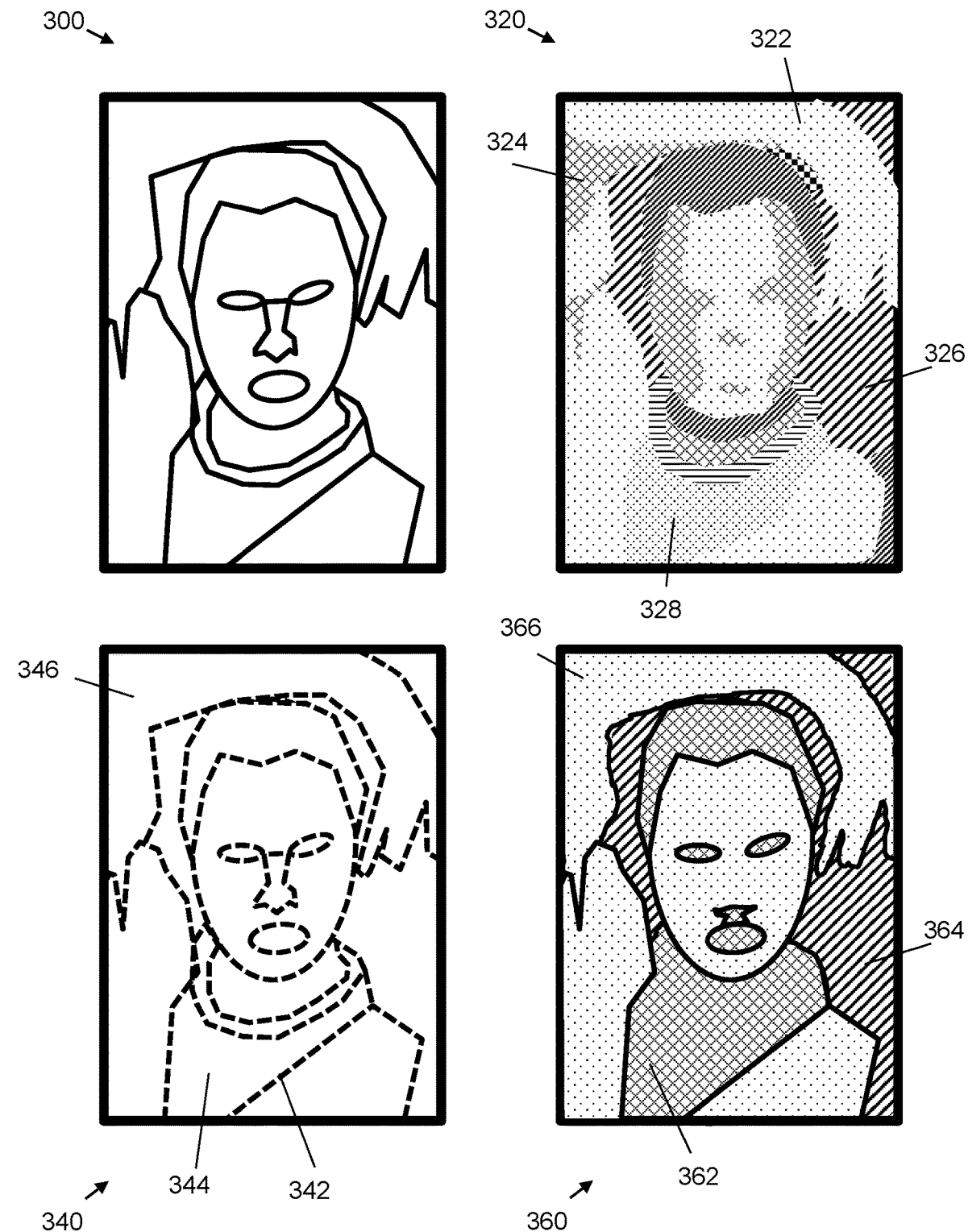
FIG. 3A is a schematic illustration showing data that is used and generated by a color processing system according to an example.
Figure 3B:
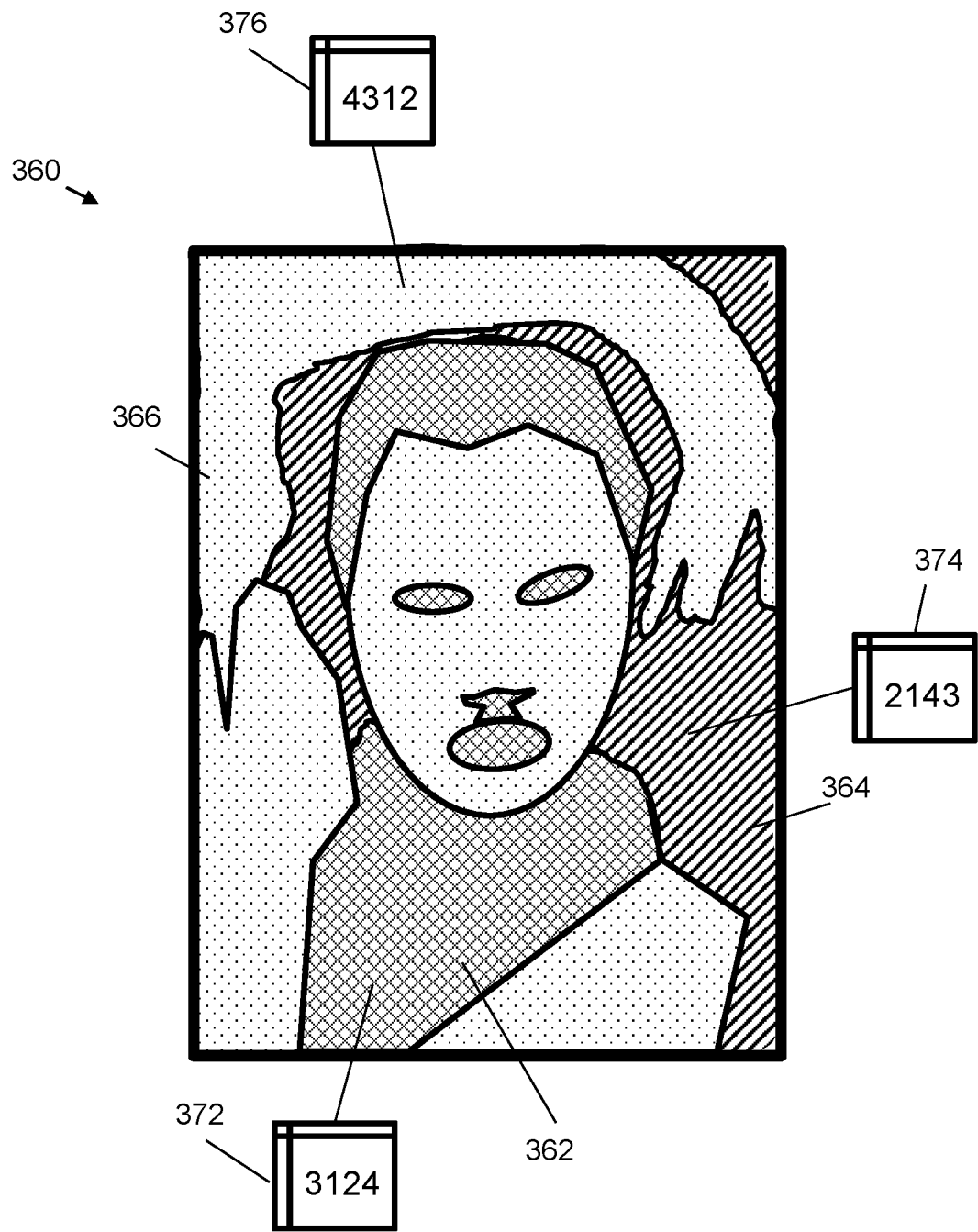
FIG. 3B is a schematic illustration of a merged cluster map showing different screen assignments according to an example.

FIGS. 3A and 3B show examples of the various maps that may be generated by the systems and methods described herein. FIG. 3A shows schematic illustrations of an original color image 300, a cluster map 320, an edge map 340 and a merged cluster map 360. It should be noted that it is not possible to recreate the true appearance of the various color images in the Figures, and so the examples of FIGS. 3A and 3B should be taken as illustrative.

The original color image 300 in FIG. 3A is a head portrait featuring a front of a face. The cluster map 320 shows a number of clusters as indicated by different methods of line shading. A first cluster 322 may be seen to largely relate to image areas with a skin tone within a range defined by the clustering. A second cluster 324 may relate to areas of shadow that are tonally distinct from the first cluster 322. A third cluster 326 may relate to tones within a range that is found within an image background. It should be noted that a common background may result in multiple clusters if the tones within that background vary. A fourth cluster 328 relates to a neck and chest area, which may be in shadow and so is deemed to form a further cluster of tones. In the cluster map 320, it may be seen how lighting effects on an object with a common tone may result in different clusters, as different illumination and shadow may lead to different pixel values for a version of the color image 300 in colorant space.

The edge map 340 indicates with dashed lines 342 a number of edges that are detected in the color image 300. Images areas within the edges may be labeled as segments. Two example segments are labeled as 344 and 346. The edge map 340 may also comprise a segment map if pixels are labeled with a corresponding segment.

The merged cluster map 360 shows a final segmentation of the color image 300 for halftoning, where the final segmentation differs from both the cluster map 320 and the edge map 340. For example, in the merged cluster map 360, clusters including the fourth cluster 328 have been merged based on the segment 344 to form a first merged cluster 362. Similarly, the different clusters of the background of the image, which include the third cluster 326, have also been merged to form a second merged cluster 364, and the first and second clusters 322, 324 have been merged to form a third merged cluster 366.

FIG. 3B shows a number of halftone screen assignments for the merged cluster map 360. In this example, there are four colorants 'CMYK' and four halftone screens '1234'; each screen assignment then represents how the four halftone screens '1234' are assigned to the four colorants. The first merged cluster 362 has a screen assignment 372 of '3124', representing screen '3' assigned to Cyan, screen '1' assigned to Magenta, screen '2' assigned to Yellow and screen '4' assigned to Black. The second merged cluster 364 has a screen assignment 374 of '2143', representing screen '2' assigned to Cyan, screen '1' assigned to Magenta, screen '4' assigned to Yellow and screen '3' assigned to Black. The third merged cluster 366 has a screen assignment 376 of '4312', representing screen '4' assigned to Cyan, screen '3' assigned to Magenta, screen '1' assigned to Yellow and screen '2' assigned to Black. Each of these assignments may be made to optimize a color property metric. An example screen assignor configured to determine such a color property metric is shown in FIG. 4.

The examples of FIGS. 3A and 3B show how halftone screens may be assigned based on the color properties of an image while preventing artifacts in a printed output. For example, FIG. 3B shows how there are different halftone screen assignments for areas of skin tone and areas of background in the original color image 300. For example, the assignment '4312' may provide a better appearance for certain skin tones, whereas the assignment '2143' may provide a better appearance for darker backgrounds. FIG. 3B also shows how the original clusters 322 and 324 are merged for the final halftoning to avoid image artifacts where these clusters meet in cluster map 320. Without merging the clusters based on the detected edges, the two clusters 322 and 324 may be assigned different halftone screens, which may produce an image artifact where the two clusters meet after halftoning (e.g. in the halftoned image 150 or 250). FIG. 3B also shows how even though a facial area is clustered into multiple regions in the cluster map 320, in the final merged cluster map 360 it is deemed to be a common cluster, again improving the appearance of this image area in a printed halftoned image.

Figure 4:
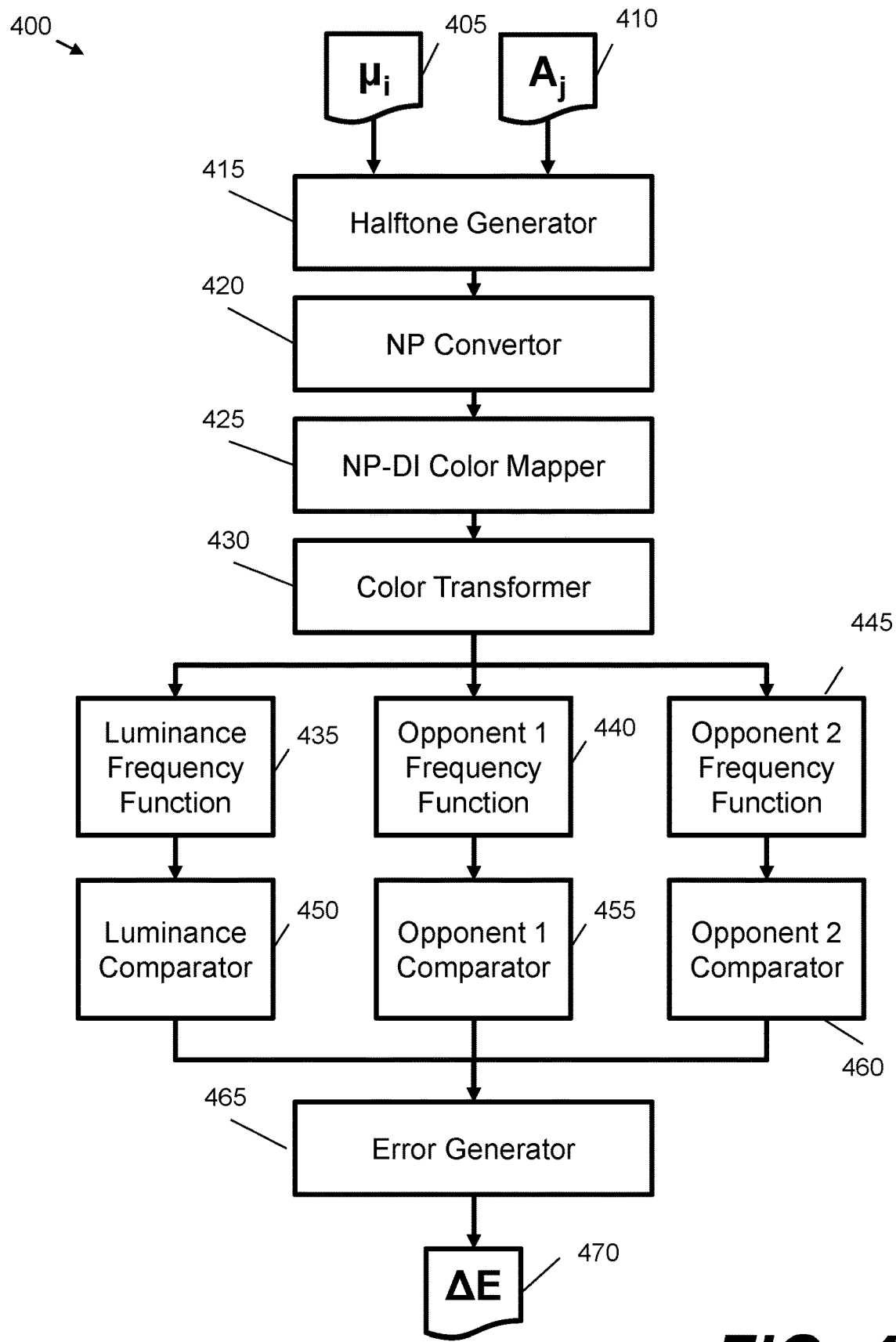
FIG. 4 is a schematic illustration of a screen assignor according to an example.

FIG. 4 shows an example of a set of components 400 that may be used to implement the first image processing pipeline 120 of FIG. 1 and/or the screen assignor 226 of FIG. 2. The set of components 400 may be used to determine which halftone screens to assign to which colorants for each cluster. The process flow between the set of components 400 shown in FIG. 4 may be repeated to determine an optimized screen-colorant mapping.

The set of components 400 operate on an absorptance vector 405 and a proposed screen assignment 410. The absorptance vector 405 may comprise a cluster centroid as generated by the cluster engine 224 or the map merge engine 242 of FIG. 2. The absorptance vector 405 may comprise a vector element for each available colorant (e.g. [$a_C$, $a_M$, $a_Y$, $a_K$] in a CMYK system). Each absorptance value may represent a normalized proportion of each colorant, e.g. a proportion between 0 and 1 representing a quantity of colorant for a given pixel. The proposed screen assignment 410 may comprise one of a set of possible screen-colorant assignments to evaluate. For example, the proposed screen assignment 410 may comprise one of the 24 possible combinations of four screens and four colorants as described with reference to FIG. 3B above.

The absorptance vector 405 and the proposed screen assignment 410 are received by a halftone generator 415. The halftone generator 415 is configured to generate a small sample of a halftone that results when the proposed screen assignment 410 is applied to the absorptance vector 405. For example, the halftone generator 415 may generate, in memory, a small image representing a patch of the resulting halftone (e.g. one inch by one inch). The sample of the halftone may be similar to halftoned image 150 or 250, e.g. similar to an output of a halftoning engine later in an image processing pipeline. In one case, the halftoning engine 140 may be used to generate the sample.

In FIG. 4, the sample of the halftone from the halftone generator 415 is received by a Neugebauer Primary (NP) convertor 420. The NP convertor 420 converts the sample of the halftone from a discrete colorant deposit space (e.g. from instructions for a printing device) to an NP space, the NP space representing different combinations of colorants (e.g. in a binary deposit case with CMYK colorants, 16 different combinations are available including white and different overprint combinations). The definition of the sample in NP space output by the NP convertor 420 is communicated to an NP to device-independent (DI) color mapper 425. The NP-to-DI color mapper 425 maps the representation of the halftone in NP space to a device independent color space. This may comprise a colorimetric color space such as a CIEXYZ-based color space. The NP-to-DI color mapper 425 may use a lookup table to map from NP space to the DI space. The lookup table, and/or an operation of the NP-to-DI color mapper 425, may be based on a measured or simulated output, e.g. by measuring spectral reflectances under controlled illumination. The output of the NP-to-DI color mapper 425 comprises a representation of the halftone defined within the device independent color space, such as a small image portion with XYZ color values.

The output of the NP-to-DI color mapper 425 is received by a color transformer 430. The color transformer 430 translates the representation of the halftone to a set of luminance and chrominance color representations. In one case, the chrominance color representations may be based on a defined opponent color space. The color transformer 430 may apply a mapping from the device independent color space to a color space that models the different responses of a human viewer to luminance and chrominance information. In one case, the L*a*b* color space or a linearized version of this color space may be used. The linearized version of the luminance and chrominance color space may use a white point for a standard illuminant (such as D65) and may preserve local averages, which may improve faithful tone reproduction.

In FIG. 4, each color component output by the color transformer 430 is passed to a dedicated processing pipeline. A luminance component is passed to a luminance frequency function 435, a first opponent chrominance component is passed to a first opponent frequency function 440 and a second opponent chrominance component is passed to a second opponent frequency function 445. The first opponent chrominance component may be based on a Red-Green opponency and the second opponent chrominance component may be based on a Blue-Yellow opponency. Each frequency function 435 to 445 may be configured to determine a spatial frequency response based on a defined spatial sensitivity of the human eye. In one case, the Daly Human Visual System model may be applied. A different frequency function may be applied to each color component, representing the different sensitivities of the human eye (e.g. the human eye is more sensitive to frequency changes in the luminance component than the chrominance components). Each frequency function may comprise a Fourier Transform applied to the spatial data of the sample of the halftone as defined in the luminance and chrominance color space.

The output from each respective frequency function 435 to 445 is communicated to a corresponding comparator. FIG. 4 shows a luminance comparator 450, which receives an output of the luminance frequency function 435, a first opponent comparator 450, which receives an output of the first opponent frequency function 440, and a second opponent comparator 460, which receives an output of the second opponent frequency function 445. Each comparator compares an output of the frequency function with a computed average of that output to generate an error for each color component. This may model fluctuations in an output image, where these fluctuations may be perceived with the human eye. The errors for each color component are then received by the error generator 465. The error generator 465 is configured to compute a final color property metric ($\Delta E$) 470 based on the received individual errors. In one case, errors for each color component may be determined on a per pixel basis with respect to the sample of the halftone, and the error generator 465 may integrate these individual pixel errors into the final color property metric 470 for the sample. The color property metric 470 may be seen as a measure of "graininess" for the halftone sample that takes into account a model of the human visual system.

The set of components 400 in FIG. 4 may be used to determine a color property metric 470 for each possible screen-colorant mapping for each cluster. For example, if there are 24 possible screen-colorant combinations, then the color property metric 470 may be computed for each of these combinations. The screen-colorant combination may be selected that minimizes the color property metric 470 (e.g. '3124' for the cluster 362 in FIG. 3B). For a case with four colorants, four halftone screens and K=10, this may involve evaluating twenty-four color property metrics ten times. The set of components 400 thus apply a spatiochromatic model based on the human visual system to determine a color assignment for a set of halftone screens that reduces perceived graininess in a viewed output.

Certain examples described herein determine an improved halftone screen assignment. In one case, each halftone screen may be defined by an M by M periodicity matrix. The periodicity matrix may represent a screen frequency and a screen angle. In one case, the periodicity matrix may be defined as $N=[z^T|w^T]$, where z and w are two tile vectors. The two tile vectors may have rational entries. Regular halftones may have integer-valued entries in the periodicity matrix and irregular halftones may have non-integer-valued entries. The two tile vectors may generate a parallelogram, which is sometimes referred to as the continuous-parameter halftone cell. The halftone screen may be applied by tiling the tile vectors across a desired spatial domain, e.g. as per $n_1 z + n_2 w$. In one example for a digital printing press, the periodicity matrix may be 2 by 2. The periodicity matrices that define the halftone screens may define a set of periodic clustered-dot halftones that are suitable for application on an electrophotographic printer, such as an LEP print device.

Figure 5:
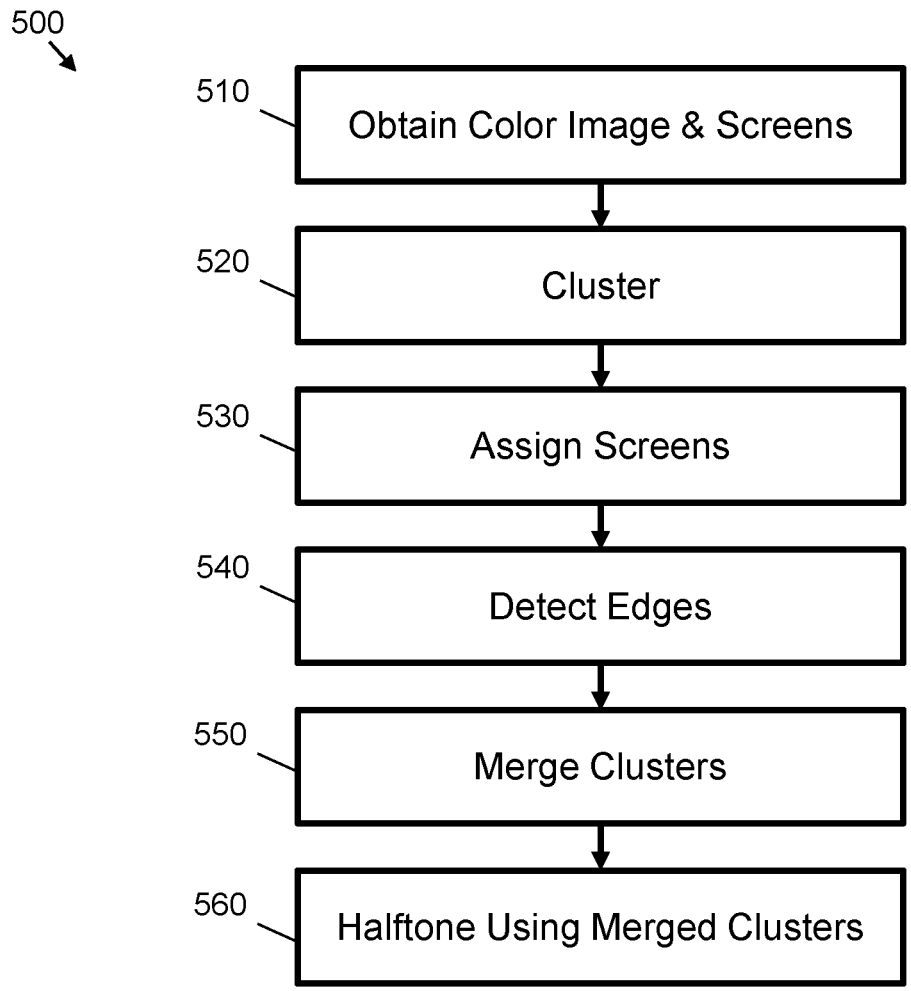
FIG. 5 is a flow chart showing a method of processing a color image according to an example.

FIG. 5 shows a method 500 for processing a color image according to an example. The method 500 may be used to halftone a color image, i.e. to generate a halftoned image. The method 500 may be implemented using the examples of FIG. 1, 2 or 4, or using different equipment. The method 500 may be performed by a computing device comprising a processor, such as a digital frontend for a digital printing press, wherein the method blocks are implemented by executing instructions retrieved from a coupled memory.

At block 510, a color image and a set of screens for halftoning are obtained. In examples as described herein, the color image and the set of screens may be stored in an accessible memory. In certain cases, the set of screens may represent halftone screens for a digital printing press coupled to the digital frontend. The set of screens may be a set of pre-existing halftone screens that have been optimized for the digital printing press. In this manner, the present example may be applied to digital printing presses with pre-optimized halftone screens without affecting this pre-optimization. The color image may comprise one or more of: a version of the image in an RGB-based color space, a version of the image in a colorant color space (e.g. in CMY or CMYK color space), a version of the image in an CIEXYZ-based color space, and a version of the image in an CIELAB-based color space. In certain cases, preprocessing operations may be performed to map the color image between various color spaces.

At block 520, the color image is clustered to determine an assignment of image portions to a set of clusters. This may comprise assigning a set of K clusters to the pixels of the color image. Clustering may be performed using pixel values in a colorant color space (e.g. based on color values as represented by absorptance values for a set of available colorants). Clustering acts to identify a relatively small set of core colors in the image. These colors often occupy relatively large areas of the color image. A union of the determined clusters may represent all the colors found in the color image. For example, in an image of a person in front of a tree below a blue sky, three of the clusters may respectively represent flesh tones for the person, green tones for the tree and blue tones for the sky. Block 520 may be performed by the cluster engine 224 of FIG. 2.

At block 530, the set of screens are assigned to the set of clusters based on color property metrics determined for the set of clusters. For example, if there are ten clusters, four colorants and four halftone screens then ten colorant-screen mappings may be determined, where each mapping represents a particular assignment of the four halftone screens to the four colorants. Block 530 may be performed by the screen assignor 226 of FIG. 2 or using the set of components 400 shown in FIG. 4. Blocks 520 and 530 may also be performed by the first image processing pipeline 120 of FIG. 1.

At block 540, a set of edges are detected in the color image. The set of edges may be detected in a version of the color image that is mapped to a device independent color space, such as a CIELAB-based color space. Edges may be detected using existing edge detection methods, e.g. such as Sobel or Canny edge detectors. Block 540 may be performed by the second image processing pipeline 130 of FIG. 1 and/or the edge detector 236 of FIG. 2.

At block 550, clusters that are assigned to image portions within the edges are merged. This may comprise merging clusters within segments defined within the set of detected edges. Merging clusters may comprise replacing multiple clusters within a set of edges with a reduced number of clusters. Block 550 may be performed by the map merge engine 242 of FIG. 2. Block 550 may merge clusters in the color image that are not spatially separated by edges. This may reduce and/or avoid changing screen assignments across spatial transitions between colors in the color image. For example, a flesh tone may have two associated clusters: one corresponding to shadowed areas, another corresponding to brightly lit areas. Merging the clusters helps ensure that as a transition is made across these clusters, the halftone texture and color change smoothly. Without merging the clusters an unnatural texture boundary between the clusters may be visible.

At block 560, the color image is halftoned using the set of screens assigned to the merged clusters. This may comprise taking the screen assignments from block 530 and applying these on a per cluster basis to the clusters than remain in a merged cluster map. In certain cases, the input to the halftoning operation at block 560 is a set of pixels representing the color image obtained at block 510 where each pixel is assigned an integer value representing one of the K clusters. This input may be seen as K sets of colorant separations where halftone screens as indicated by the screen assignments are applied to each of the colorant separations (e.g. four separations for CMYK printing presses) in each of the K sets, and where the halftone screens may be applied differently to the colorant separations for each of the K sets, and where each colorant separation represents colorant values for pixels assigned to a particular set. Although FIG. 5 shows block 530 occurring before block 550, in certain cases, the assignment of screens may be performed following the merging of clusters at block 550. In this case, the centroids of each cluster may change following the merging of clusters; these revised centroids may then be used to determine a color property metric for the screen assignment, e.g. as described with reference to FIG. 4.

In certain examples, the color image is converted to a colorant space at block 510, wherein the clustering at block 520 is performed based on absorptance values for each of a set of colorants in the colorant space. In this case, assigning the set of screens to the set of clusters at block 530 may comprise determining mean absorptance values for the set of colorants for each cluster, and, for each cluster in the set of clusters, determining a mapping of each colorant in the set of colorants to a screen in the set of screens that reduce an error based on luminance and chrominance color representations of the mean absorptance values for the cluster. For example, this may be performed as described with reference to FIG. 4. In certain cases, the set of screens comprise a set of periodicity matrices and assigning the set of screens to the set of clusters comprises determining a mapping of these matrices to available colorants for each cluster in the set of clusters.

In certain examples, obtaining a color image at block 510 comprises obtaining an original color image having tristimulus color values, such as an RGB-based image, and converting the color image to a colorant space, wherein the clustering at block 520 is performed on the color image as converted to the colorant space and the detecting of a set of edges at block 540 is performed on the original color image. In one case, block 540 may be performed on the original color image as converted to a CIELAB-based color space.

In certain examples, block 540 may comprise determining a set of segments based on the set of edges. In this case, merging clusters at block 550 may comprise, for a given segment in the set of segments, counting a number of image portions (e.g. pixels) within the given segment that are assigned to each cluster, selecting a replacement cluster as the cluster with a largest count value, and assigning the image portions within the given segment to the replacement cluster. In certain cases, a predefined number, S, of segments is obtained. The method 500 then comprises converting the color image to a device-independent color space, applying a bilateral filter to the converted color image, detecting the set of edges in the filtered color image, and post-processing the detected edges to generate a segmented edge map, the segmented edge map dividing the color image into the obtained number of segments. This, for example, may be performed by the second set of components 230 shown in FIG. 2. Bilateral filtering may help to smooth the image. Post processing of the detected edges may comprise thinning the edges and applying connected component analysis to identify segments that are separated by edges, where clusters are merged that are not separated by an edge.

The example methods described above help reduce graininess in halftoned images. For example, the methods may reduce excessive graininess due to the interaction of superimposed colorant planes generated with different halftone screens. This may improve image quality in digital printing presses, such as those that use LEP printing devices and clustered-dot, periodic halftoning patterns. These methods vary the screen assignment within a color image in a color-and-content-dependent manner that helps reduce perceived graininess.

Figure 6:
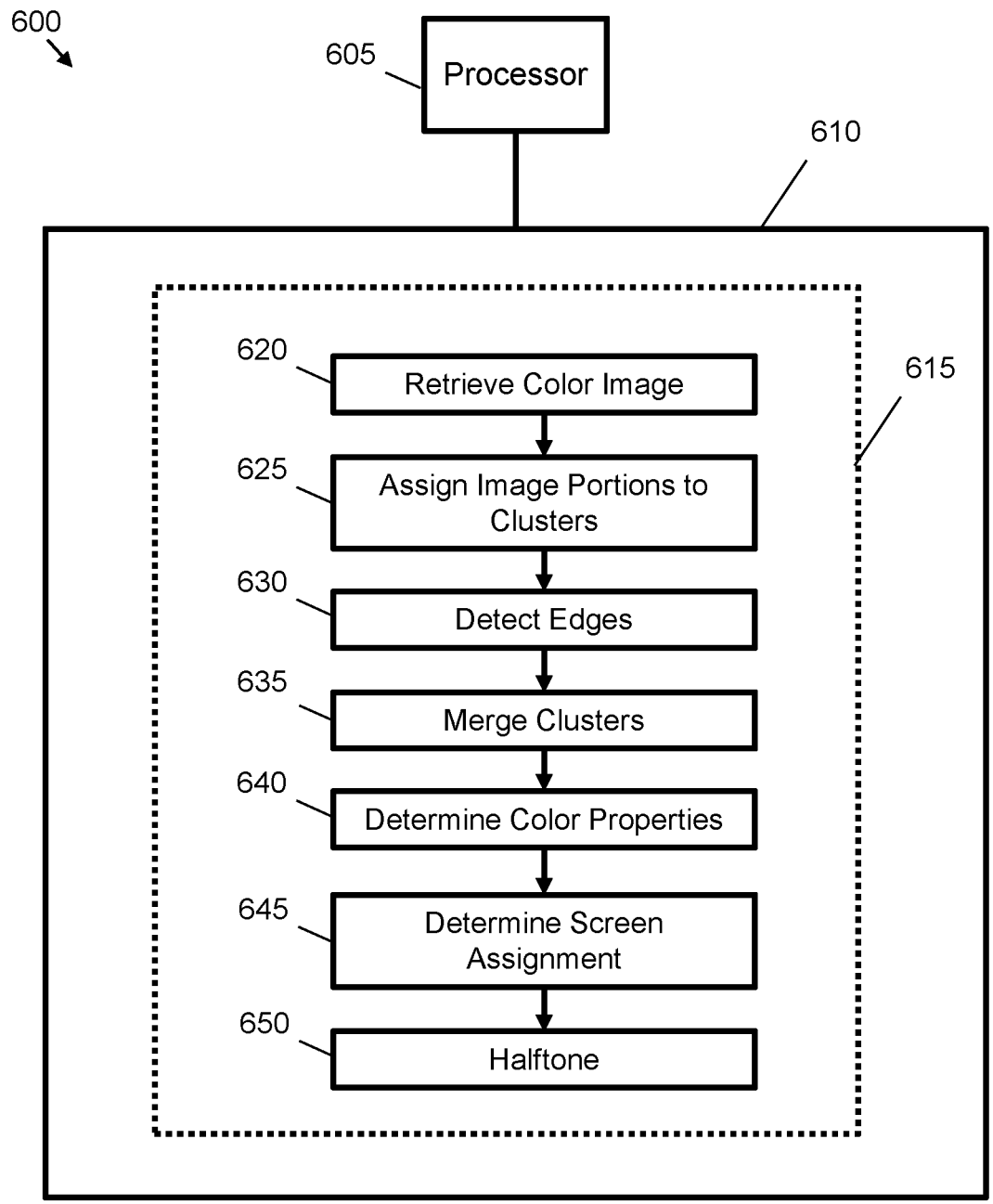
FIG. 6 is a schematic illustration of a non-transitory computer-readable storage medium according to an example.

FIG. 6 shows an example 600 of a processor 605 communicatively coupled to a non-transitory computer-readable storage medium 610 that stores instructions 615 for execution by the processor 605. Via instruction 620, the processor 605 is instructed to retrieve a color image from memory. Via instruction 625, the processor 605 is instructed assign image portions derived from the color image to a set of clusters. Via instruction 630, the processor 605 is instructed to detect a set of edges in the color image. Via instruction 635, the processor 605 is instructed to merge clusters assigned to image portions within the edges. Via instruction 640, the processor 605 is instructed to determine color property metrics for the set of clusters based on image portions assigned to each cluster. Via instruction 645, the processor 605 is instructed to determine an assignment of a set of screens for halftoning to the set of clusters based on the color property metrics. Lastly, via instruction 650, the processor 605 is instructed to halftone the color image using the set of screens assigned to the clusters.

The instructions 615 may represent an implementation of the method 500 from FIG. 5, where the assignment of halftones screens to clusters is performed following the merging of clusters. For example, following the merging of clusters instructed by instruction 635, a centroid value of each cluster may be updated, e.g. by averaging the pixels belonging to the cluster including any newly updated pixels following the merging of clusters. The screen assignment instructed via instruction 645 may thus be based on the updated centroid values, e.g. these values may comprise the absorptance vectors 405 in FIG. 4. In other cases, instructions 645 and 650 may be executed before instruction 635.

In certain examples, the set of screens comprise irregular halftones defined by a set of periodicity matrices. In these and other cases, the instructions may cause the process to retrieve a predefined number of clusters from memory, i.e. a value for K; obtain a version of the color image defined in a colorant space; and apply a K-means clustering function to pixel values of the version of the color image defined in the colorant space to determine the predefined number of clusters.

At least some aspects of the examples described herein with reference to the drawings may be implemented using computer processes operating in processing systems or processors, e.g. as described with reference to FIG. 6. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Similarly, it will be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least the image processing pipelines and components as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

Certain examples described herein relate to the halftoning of a color image. In one example, a set of clusters are determined based on the color image. A set of edges are also detected in the color images. Clusters within these edges are then merged. A set of screens for halftoning are assigned to the set of clusters. This assignment is based on color property metrics for the set of clusters. The color image is halftoned using the set of screens assigned to the merged clusters.

Certain examples described herein address variations in print stability when printing halftoned images. For example, clustered-dot periodic halftone patterns may be applied in a color and content dependent manner to reduce the effect of variations in print stability, e.g. small variations in dot placement while printing a halftoned image. Certain examples apply a model of the human visual system to minimize a perceived error when viewing a superposition of two or more regular or irregular halftones. These examples allow for different colorant-screen assignments for different portions of a color image, e.g. for different tones of the image, where it has been found that a perceived error of an applied halftone screen varies with tone color, e.g. a screen assignment for flesh tones may generate perceived artifacts in a printed image when applied to a tone for foliage or the sky. The present examples vary the screen assignment based on tone while also reducing transition effects for continuous areas of tone, such as skin or sky.

The preceding description has been presented to illustrate and describe examples of the principles described. This description is not intended to be exhaustive or to limit these principles to any precise form disclosed. Features of individual examples may be combined in different configurations, including those not explicitly set out herein. Many modifications and variations are possible in light of the above teaching.

What is claimed is:

1. A method comprising:
  obtaining a color image and a set of screens for halftoning;
  clustering the color image to determine an assignment of image portions to a set of clusters;
  assigning the set of screens to the set of clusters based on color property metrics determined for the set of clusters;
  detecting a set of edges in the color image;
  merging clusters assigned to image portions within the edges; and
  halftoning the color image using the set of screens assigned to the merged clusters.

2. The method of claim 1, wherein clustering the color image comprises:
  converting the color image to a colorant space, wherein the clustering is performed based on absorptance values for each of a set of colorants in the colorant space.

3. The method of claim 2, wherein assigning the set of screens to the set of clusters comprises:
  determining mean absorptance values for the set of colorants for each cluster; and
  for each cluster in the set of clusters, determining a mapping of each colorant in the set of colorants to a screen in the set of screens that reduce an error based on luminance and chrominance color representations of the mean absorptance values for the cluster.

4. The method of claim 1, wherein the set of screens comprise a set of periodicity matrices and assigning the set of screens to the set of clusters comprises:
  determining a colorant-screen mapping for each cluster in the set of clusters.

5. The method of claim 1, wherein obtaining a color image comprises: obtaining an original color image having tristimulus color values; and
  converting the color image to a colorant space,
  wherein the clustering is performed on the color image as converted to the colorant space and the detecting of a set of edges is performed on the original color image.

6. The method of claim 1,
  wherein detecting a set of edges comprises determining a set of segments based on the set of edges, and
  wherein merging clusters comprises, for a given segment in the set of segments:
  counting a number of image portions within the given segment that are assigned to each cluster;
  selecting a replacement cluster as the cluster with a largest count value; and
  assigning the image portions within the given segment to the replacement cluster.

7. The method of claim 6, wherein determining a set of segments based on the set of edges comprises:
  obtaining a number of segments;
  converting the color image to a device-independent color space;
  applying a bilateral filter to the converted color image;
  detecting the set of edges in the filtered color image; and
  post-processing the detected edges to generate a segmented edge map, the segmented edge map dividing the color image into the obtained number of segments.

8. A color processing system comprising:
  a first image processing pipeline to determine a set of clusters based on a color image and to assign a set of screens for halftoning to the set of clusters, the set of screens being assigned based on color property metrics for the set of clusters;
  a second image processing pipeline to detect a set of edges in the color image; and
  a halftoning engine to merge clusters assigned to image portions within the detected edges and to halftone the color image using the set of screens assigned to the merged clusters.

9. The color processing system of claim 8, wherein the first image processing pipeline is configured to determine a colorant-screen mapping for each cluster, the colorant-screen mapping indicating one of the set of screens to use for each of a set of colorants.

10. The color processing system of claim 8, wherein the second image processing pipeline is configured to receive a number of segments and to segment the color image into the number of segments using the set of edges, the halftoning engine being configured to merge clusters within each of the number of segments.

11. The color processing system of claim 8, wherein the halftoning engine is configured to halftone the color image to generate print data for a liquid electrophotographic printing device.

12. The color processing system of claim 8, wherein the first image processing pipeline is configured to cluster pixels of the color image with color values defined in a colorant space and the second image processing pipeline is configured to detect edges based on pixels with values in a colorimetric color space.

13. A non-transitory computer-readable storage medium storing instructions that, when executed by a processor, cause the processor to:
retrieve a color image from memory;
assign image portions derived from the color image to a set of clusters;
detect a set of edges in the color image;
merge clusters assigned to image portions within the edges;
determine color property metrics for the set of clusters based on image portions assigned to each cluster;
determine an assignment of a set of screens for halftoning to the set of clusters based on the color property metrics; and
halftone the color image using the set of screens assigned to the clusters.

14. The medium of claim 13, wherein the set of screens comprise irregular halftones defined by a set of periodicity matrices.

15. The medium of claim 13, wherein the instructions cause the process to:
retrieve a predefined number of clusters from memory;
obtain a version of the color image defined in a colorant space; and
apply a K-means clustering function to pixel values of the version of the color image defined in the colorant space to determine the predefined number of clusters.

* * * * *